US012719526B2

(12) United States Patent
Pan et al.

(10) Patent No.: US 12,719,526 B2
(45) Date of Patent: Aug. 25, 2026

(54) COMMUNICATION METHOD AND COMMUNICATION APPARATUS

(71) Applicant: Huawei Technologies Co., Ltd., Shenzhen (CN)

(72) Inventors: Dao Pan, Dongguan (CN); Zefeng Lin, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 56 days.

(21) Appl. No.: 18/986,006

(22) Filed: Dec. 18, 2024

(65) Prior Publication Data

US 2025/0253889 A1 Aug. 7, 2025

Related U.S. Application Data

(63) Continuation of application No. PCT/CN2023/102082, filed on Jun. 25, 2023.

(30) Foreign Application Priority Data

Jun. 28, 2022 (CN) ........................ 202210742857.5
Nov. 2, 2022 (CN) ........................ 202211361314.5

(51) Int. Cl.
*H04B 3/54* (2006.01)

(52) U.S. Cl.
CPC .................................. *H04B 3/542* (2013.01)

(58) Field of Classification Search
CPC .. H04B 3/542; H04B 2203/5433; H04B 3/54; H04B 17/309; H04B 3/46; H04L 5/0051; H04L 25/08
USPC ........................................................ 375/257
See application file for complete search history.

(56) References Cited

U.S. PATENT DOCUMENTS

2015/0103751 A1 4/2015 Afkhami et al.
2023/0275616 A1* 8/2023 Eleftheriadis ............ H04B 3/54 375/257

FOREIGN PATENT DOCUMENTS

| | | | |
|---|---|---|---|
| CN | 101512922 | A | 8/2009 |
| CN | 110114995 | A | 8/2019 |
| CN | 110838863 | A | 2/2020 |
| CN | 112565116 | A | 3/2021 |

OTHER PUBLICATIONS

Haniph A. Latchman et al, Homeplug AV Andieee 1901, A Handbook for PLC Designers and Users, Mar. 8, 2013, total 374 pages.

(Continued)

*Primary Examiner* — Fitwi Y Hailegiorgis
(74) *Attorney, Agent, or Firm* — Conley Rose, P.C.

(57) ABSTRACT

A first communication apparatus sends a first communication frame to a second communication apparatus, where the first communication frame is used for channel quality measurement. The first communication apparatus receives a second communication frame from the second communication apparatus, where the second communication frame includes first indication information that indicates at least one frequency band whose power spectrum density is to be increased in a robust communication frame, or the first indication information indicates channel quality of at least one frequency band in a robust communication frame.

20 Claims, 4 Drawing Sheets

400

First communication apparatus

Second communication apparatus

S401: Send a first communication frame, where the first communication frame is used for channel quality measurement S402: Send a second communication frame, where the second communication frame includes first indication information, and the first indication information indicates at least one frequency band whose power spectrum density is to be increased in a robust communication frame

(56) References Cited

OTHER PUBLICATIONS

ITU-T G.9960 (Nov. 2018), Series G: Transmission Systems and Media, Digital Systems and Networks Access networks—In premises networks, Unified high-speed wire-line based home networking transceivers—System architecture and physical layer specification, total 150 pages.

Metanoia Technologies Inc., et al., "G.hn, G.vdsl, G.fast : Powerline Interference Indication and Mitigation for DSL transceivers," COM 15—C 0175—E, Telecommunication Standardization Sector Jul. 2013, 16 pages.

"HomePlug AV Specification Version 2.1," Version 2.1, Feb. 21, 2014, 858 pages.

"HomePlug Green PHY Specification HomePlug Green PHY," Release Version 1.1.1, Jul. 4, 2013, 762 pages.

"Series G: Transmission Systems and Media, Digital Systems and Networks Applications of ITU-T G.9960, ITU-T G.9961 transceivers for Smart Grid applications: Advanced metering infrastructure, energy management in the home and electric vehicles," Technical Paper, Jun. 2010, 32 pages.

"IEEE 1901.1.1™M/D0.76 Draft Standard for Standard Test Procedures for IEEE 1901.1 Standard for Medium Frequency (less than 15 MHZ) Power Line Communications for Smart Grid Applications," P1901.1.1/D0.75, Sep. 2019, 187 pages.

"HomePlug 1.0.1 Specification," Homeplug Powerline Alliance, ITR524-1010, Dec. 1, 2001, 145 pages.

* cited by examiner

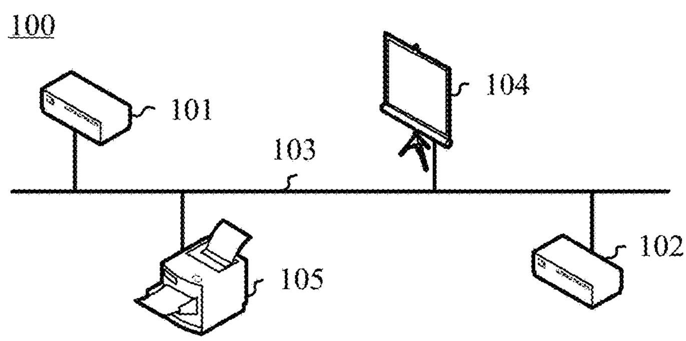
FIG. 1
| | Frequency band 1 | Frequency band 2 | Frequency band 3 | Frequency band 4 |
|---|---|---|---|---|
| Symbol 1 | SEC 1 | SEC 2 | SEC 3 | SEC 1 |
| Symbol 2 | SEC 2 | SEC 3 | SEC 1 | SEC 2 |
| Symbol 3 | SEC 3 | SEC 1 | SEC 2 | SEC 3 |
Frequency
Time
FIG. 2
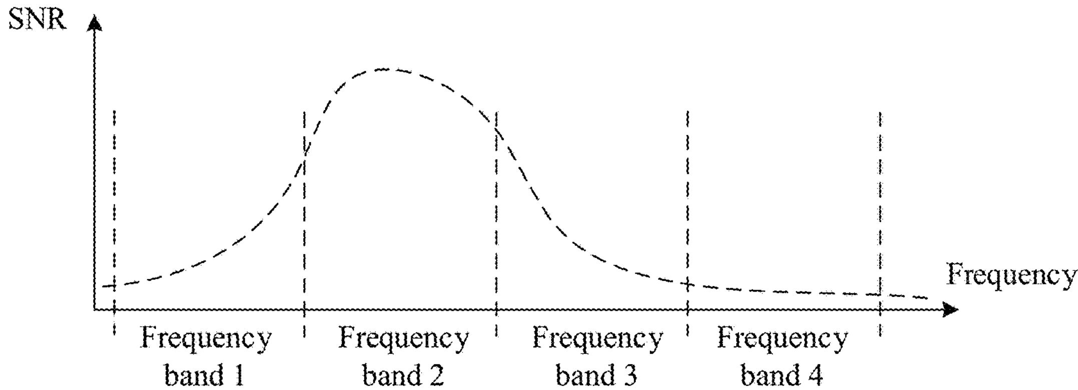
FIG. 3

PSD before an increase
PSD after an increase
PSD
Increased by 6 dB
Decreased by 20 dB
Decreased by 20 dB
Frequency
Frequency band 0
Frequency band 1
Frequency band 2
Frequency band 3

COMMUNICATION METHOD AND COMMUNICATION APPARATUS

CROSS-REFERENCE TO RELATED APPLICATIONS

This is a continuation of Int'l Patent App. No. PCT/CN2023/102082, filed on Jun. 25, 2023, which claims priority to Chinese Patent App. No. 202210742857.5, filed on Jun. 28, 2022 and Chinese Patent App. No. 202211361314.5, filed on Nov. 2, 2022, each of which is incorporated by reference.

TECHNICAL FIELD

This disclosure relates to the communication field, and more specifically, to a communication method and a communication apparatus.

BACKGROUND

In power line communication (PLC), also referred to as a power line network, data or information is transmitted through an existing power line by using a digital signal processing method. In a PLC technology, broadband data is sent through an existing low-frequency (for example, 50 hertz (Hz) or 60 Hz) alternating-current or direct-current power line.

An advantage of power line communication lies in that a power line has a wide coverage area and no additional network line needs to be laid. However, the power line is not a line designed for communication, and a user may add various electrical loads to the power line at any time. Consequently, load impedance and noise interference on the line change in real time, affecting reliability of power line communication.

SUMMARY

Embodiments of this disclosure provide a communication method and a communication apparatus, to improve reliability of power line communication.

According to a first aspect, a communication method is provided. The method is applied to power line communication PLC communication. The method may be performed by a communication device or an apparatus (for example, a chip or a chip module) configured in (or used in) a communication device. An example in which a first communication apparatus performs the method is used below for description.

The method includes: The first communication apparatus sends a first communication frame to a second communication apparatus, where the first communication frame is used for channel quality measurement. The first communication apparatus receives a second communication frame from the second communication apparatus, where the second communication frame includes first indication information.

In an implementation, the first indication information indicates to increase a power spectrum density of at least one frequency band in a robust communication frame.

In other words, the first indication information indicates at least one frequency band, and the at least one frequency band is a frequency band whose power spectrum density needs to be increased in a robust communication frame.

According to the foregoing solution, after measuring channel quality of each frequency band based on a communication frame, a receive end (namely, the second communication apparatus) feeds back at least one frequency band with good channel quality to a transmit end (namely, the first communication apparatus), so that the transmit end increases a power spectrum density of the at least one frequency band in a robust communication frame. A power spectrum density of a frequency band with good channel quality is increased, so that reliability of communication can be improved.

In another implementation, the first indication information indicates channel quality of at least one frequency band in a robust communication frame.

According to the foregoing solution, after obtaining channel quality of each frequency band by measuring the first communication frame, the receive end feeds back channel quality of at least one frequency band in the communication frame to the transmit end, so that the transmit end can determine a frequency band with good channel quality based on the channel quality fed back by the receive end, and increase a power spectrum density of the frequency band with good channel quality in a robust communication frame. This can improve transmission reliability of a communication frame, and increase a probability that a communication frame is correctly received.

For example, a robust communication frame is used to carry a code block, the code block is processed and segmented into a plurality of sections, and a frequency domain resource occupied by one section in the robust communication frame is referred to as a frequency band. In other words, a frequency domain resource that is in a robust communication frame and that carries one section is referred to as a frequency band.

With reference to the first aspect, in some implementations of the first aspect, the method further includes: The first communication apparatus sends a third communication frame to the second communication apparatus, where a power spectrum density of the at least one frequency band in the third communication frame is higher than a power spectrum density of at least one frequency band in the first communication frame, and the third communication frame is the robust communication frame.

According to the foregoing solution, the first communication apparatus increases, based on the indication of the first indication information, a power spectrum density of at least one frequency band with good channel quality in the third communication frame, to increase a probability that the third communication frame is correctly received.

With reference to the first aspect, in some implementations of the first aspect, the first communication frame and the third communication frame are data frames, and data in the third communication frame is retransmitted data of data in the first communication frame.

According to the foregoing solution, when transmission of the data in the first communication frame fails, the second communication apparatus may notify the first communication apparatus of at least one frequency band with good channel quality. In this way, the first communication apparatus may increase a power spectrum density of the at least one frequency band with good channel quality when sending a retransmitted data frame (namely, the third communication frame), to increase a probability that the data frame is correctly received.

With reference to the first aspect, in some implementations of the first aspect, the third communication frame is a data frame, and data in the third communication frame is initially transmitted data.

According to the foregoing solution, after receiving the second communication frame, the first communication apparatus may increase, based on the first indication information in the second communication frame, a power spectrum density of the at least one frequency band in the subsequently sent third communication frame that includes the initially transmitted data, to improve transmission reliability of the data frame.

With reference to the first aspect, in some implementations of the first aspect, the robust communication frame is a communication frame in a robust orthogonal frequency-division multiplexing (ROBO) mode or a robust communication mode (RCM).

With reference to the first aspect, in some implementations of the first aspect, the second communication frame is an acknowledgement (ACK) frame for the first communication frame, or the second communication frame is a management frame.

For example, the management frame may be a management logical link control (LLC) frame.

With reference to the first aspect, in some implementations of the first aspect, the first communication frame is a probe frame.

With reference to the first aspect, in some implementations of the first aspect, the method further includes: determining the power spectrum density of the at least one frequency band in the third communication frame based on a quantity of frequency bands included in the at least one frequency band and a first correspondence, where the first correspondence is a correspondence between a plurality of quantities of frequency bands and a plurality of power spectrum densities.

For example, the first correspondence may be predefined or preconfigured.

According to the foregoing solution, the first communication apparatus may determine the power spectrum density of the at least one frequency band based on a quantity of frequency bands indicated by the first indication information and the first correspondence.

With reference to the first aspect, in some implementations of the first aspect, the first indication information includes a bitmap indicating the at least one frequency band, and one bit in the bitmap corresponds to one frequency band in a communication frame; or the first indication information includes an identifier of the at least one frequency band.

According to the foregoing solution, the first indication information may notify, by using a bitmap corresponding to a frequency band or an identifier of a frequency band, the first communication apparatus of a frequency band whose power spectrum density needs to be increased, so that the first communication apparatus and the second communication apparatus can reach a consensus on a frequency band whose power spectrum density needs to be increased.

With reference to the first aspect, in some implementations of the first aspect, the second communication frame further includes second indication information, and the second indication information indicates the power spectrum density of the at least one frequency band, or the second indication information indicates an increase in the power spectrum density of the at least one frequency band.

According to the foregoing solution, the second communication apparatus may further notify, by using the second communication frame, the first communication apparatus of the power spectrum density of the at least one frequency band or the increase in the power spectrum density, so that the first communication apparatus can increase the power spectrum density based on the indication from the second communication apparatus.

With reference to the first aspect, in some implementations of the first aspect, the third communication frame is a broadcast frame or a multicast frame.

According to the foregoing solution, the technical solutions provided in this disclosure may be applied to broadcast or multicast communication to improve transmission reliability of a broadcast frame or a multicast frame.

According to a second aspect, a communication method is provided. The method is applied to power line communication PLC communication. The method may be performed by a communication device or an apparatus (for example, a chip or a chip module) configured in (or used in) a communication device. An example in which the second communication apparatus performs the method is used below for description.

The method includes: A second communication apparatus receives a first communication frame from a second communication apparatus, where the first communication frame is used for channel quality measurement. The second communication apparatus sends a second communication frame to the first communication apparatus, where the second communication frame includes first indication information, and the first indication information indicates at least one frequency band whose power spectrum density is to be increased in a robust communication frame, or the first indication information indicates channel quality of at least one frequency band in a robust communication frame.

With reference to the second aspect, in some implementations of the second aspect, the method further includes: The second communication apparatus receives a third communication frame from the first communication apparatus, where a power spectrum density of the at least one frequency band in the third communication frame is higher than a power spectrum density of at least one frequency band in the first communication frame, and the third communication frame is the robust communication frame.

With reference to the second aspect, in some implementations of the second aspect, the first communication frame and the third communication frame are data frames, and data in the third communication frame is retransmitted data of data in the first communication frame.

With reference to the second aspect, in some implementations of the second aspect, the third communication frame is a data frame, and data in the third communication frame is initially transmitted data.

With reference to the second aspect, in some implementations of the second aspect, the robust communication frame is a communication frame in a robust orthogonal frequency-division multiplexing ROBO mode or a robust communication mode RCM.

With reference to the second aspect, in some implementations of the second aspect, the second communication frame is an acknowledgement ACK frame for the first communication frame.

With reference to the second aspect, in some implementations of the second aspect, the first communication frame is a probe frame.

With reference to the second aspect, in some implementations of the second aspect, the first indication information includes a bitmap indicating the at least one frequency band, and one bit in the bitmap corresponds to one frequency band in a communication frame; or the first indication information includes an identifier of the at least one frequency band.

With reference to the second aspect, in some implementations of the second aspect, the second communication frame further includes second indication information, and the second indication information indicates the power spectrum density of the at least one frequency band, or the second indication information indicates an increase in the power spectrum density of the at least one frequency band.

With reference to the second aspect, in some implementations of the second aspect, the third communication frame is a broadcast frame or a multicast frame.

According to a third aspect, a communication apparatus is provided. In a design, the apparatus may include modules that are in a one-to-one correspondence with and that perform the methods, operations, steps, or actions described in the first aspect. The modules may be hardware circuits or software, or may be implemented through a combination of a hardware circuit and software. In a design, the apparatus includes: a transceiver unit, configured to send a first communication frame to a second communication apparatus, where the first communication frame is used for channel quality measurement, and the transceiver unit is further configured to receive a second communication frame from the second communication apparatus, where the second communication frame includes first indication information, and the first indication information indicates at least one frequency band whose power spectrum density is to be increased in a robust communication frame, or the first indication information indicates channel quality of at least one frequency band in a robust communication frame; and a processing unit, configured to control the transceiver unit to receive or send a communication frame.

With reference to the third aspect, in some implementations of the third aspect, the method further includes: The transceiver unit is further configured to send a third communication frame to the second communication apparatus, where a power spectrum density of the at least one frequency band in the third communication frame is higher than a power spectrum density of at least one frequency band in the first communication frame, and the third communication frame is the robust communication frame.

With reference to the third aspect, in some implementations of the third aspect, the first communication frame is a data frame, and data in the third communication frame is retransmitted data of data in the first communication frame.

With reference to the third aspect, in some implementations of the third aspect, the robust communication frame is a communication frame in a robust orthogonal frequency-division multiplexing ROBO mode or a robust communication mode RCM.

With reference to the third aspect, in some implementations of the third aspect, the second communication frame is an acknowledgement ACK frame for the first communication frame.

With reference to the third aspect, in some implementations of the third aspect, the first communication frame is a probe frame.

With reference to the third aspect, in some implementations of the third aspect, the processing unit is further configured to determine the power spectrum density of the at least one frequency band in the third communication frame based on a quantity of frequency bands included in the at least one frequency band and a first correspondence, where the first correspondence is a correspondence between a plurality of quantities of frequency bands and a plurality of power spectrum densities.

With reference to the third aspect, in some implementations of the third aspect, the first indication information includes a bitmap indicating the at least one frequency band, and one bit in the bitmap corresponds to one frequency band in a communication frame; or the first indication information includes an identifier of the at least one frequency band.

With reference to the third aspect, in some implementations of the third aspect, the second communication frame further includes second indication information, and the second indication information indicates the power spectrum density of the at least one frequency band, or the second indication information indicates an increase in the power spectrum density of the at least one frequency band.

With reference to the third aspect, in some implementations of the third aspect, the third communication frame is a broadcast frame or a multicast frame.

According to a fourth aspect, a communication apparatus is provided. In a design, the apparatus may include modules that are in a one-to-one correspondence with and that perform the methods, operations, steps, or actions described in the second aspect. The modules may be hardware circuits or software, or may be implemented through a combination of a hardware circuit and software. In a design, the apparatus includes a transceiver unit, configured to receive a first communication frame from a second communication apparatus, where the first communication frame is used for channel quality measurement. The transceiver unit is further configured to send a second communication frame to the first communication apparatus, where the second communication frame includes first indication information, and the first indication information indicates at least one frequency band whose power spectrum density is to be increased in a robust communication frame, or the first indication information indicates channel quality of at least one frequency band in a robust communication frame.

With reference to the fourth aspect, in some implementations of the fourth aspect, the transceiver unit is further configured to receive a third communication frame from the first communication apparatus, where a power spectrum density of the at least one frequency band in the third communication frame is higher than a power spectrum density of at least one frequency band in the first communication frame, and the third communication frame is the robust communication frame.

With reference to the fourth aspect, in some implementations of the fourth aspect, the first communication frame is a data frame, and data in the third communication frame is retransmitted data of data in the first communication frame.

With reference to the fourth aspect, in some implementations of the fourth aspect, the robust communication frame is a communication frame in a robust orthogonal frequency-division multiplexing ROBO mode or a robust communication mode RCM.

With reference to the fourth aspect, in some implementations of the fourth aspect, the second communication frame is an acknowledgement ACK frame for the first communication frame.

With reference to the fourth aspect, in some implementations of the fourth aspect, the first communication frame is a probe frame.

With reference to the fourth aspect, in some implementations of the fourth aspect, the first indication information includes a bitmap indicating the at least one frequency band, and one bit in the bitmap corresponds to one frequency band in a communication frame; or the first indication information includes an identifier of the at least one frequency band.

With reference to the fourth aspect, in some implementations of the fourth aspect, the second communication frame further includes second indication information, and the second indication information indicates the power spectrum density of the at least one frequency band, or the second indication information indicates an increase in the power spectrum density of the at least one frequency band.

With reference to the fourth aspect, in some implementations of the fourth aspect, the third communication frame is a broadcast frame or a multicast frame.

According to a fifth aspect, a communication apparatus is provided, including a processor. The processor may implement the method according to any one of the first aspect, the second aspect, or the possible implementations of the first aspect or the second aspect. Optionally, the communication apparatus further includes a memory. The processor is coupled to the memory, and may be configured to execute instructions in the memory, to implement the method according to any one of the first aspect, the second aspect, or the possible implementations of the first aspect or the second aspect. Optionally, the communication apparatus further includes a communication interface, and the processor is coupled to the communication interface. In this embodiment, the communication interface may be a transceiver, a pin, a circuit, a bus, a module, or another type of communication interface. This is not limited.

In an implementation, the communication apparatus is a communication device. When the communication apparatus is a terminal device, the communication interface may be a transceiver or an input/output interface.

In another implementation, the communication apparatus is a chip configured in a communication device. When the communication apparatus is a chip configured in a communication device, the communication interface may be an input/output interface.

Optionally, the transceiver may be a transceiver circuit. Optionally, the input/output interface may be an input/output circuit.

According to a sixth aspect, a processor is provided, including an input circuit, an output circuit, and a processing circuit. The processing circuit is configured to receive a signal through the input circuit, and transmit a signal through the output circuit, so that the processor performs the method according to any one of the first aspect, the second aspect, or the possible implementations of the first aspect or the second aspect.

During specific implementation, the processor may be one or more chips, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver. A signal output by the output circuit may be output to, for example, but not limited to, a transmitter, and transmitted by the transmitter. In addition, the input circuit and the output circuit may be a same circuit, and the circuit serves as the input circuit and the output circuit at different moments. Specific implementations of the processor and various circuits are not limited in embodiments of this disclosure.

According to a seventh aspect, a computer program product is provided. The computer program product includes a computer program (which may also be referred to as code or instructions). When the computer program is run, a computer is enabled to perform the method according to any one of the first aspect, the second aspect, or the possible implementations of the first aspect or the second aspect.

According to an eighth aspect, a computer-readable storage medium is provided. The computer-readable storage medium stores a computer program (which may also be referred to as code or instructions). When the computer program is run on a computer, the computer is enabled to perform the method according to any one of the first aspect, the second aspect, or the possible implementations of the first aspect or the second aspect.

According to a ninth aspect, a communication system is provided, including at least one first communication apparatus and at least one second communication apparatus in the foregoing descriptions.

BRIEF DESCRIPTION OF DRAWINGS

FIG. 1 is a diagram of a power line communication system according to an embodiment;

FIG. 2 is a diagram of a robust communication frame according to an embodiment;

FIG. 3 is a diagram of SNRs of frequency bands of a communication frame transmitted in a power line channel according to an embodiment;

DESCRIPTION OF EMBODIMENTS

Figures 4, 5:
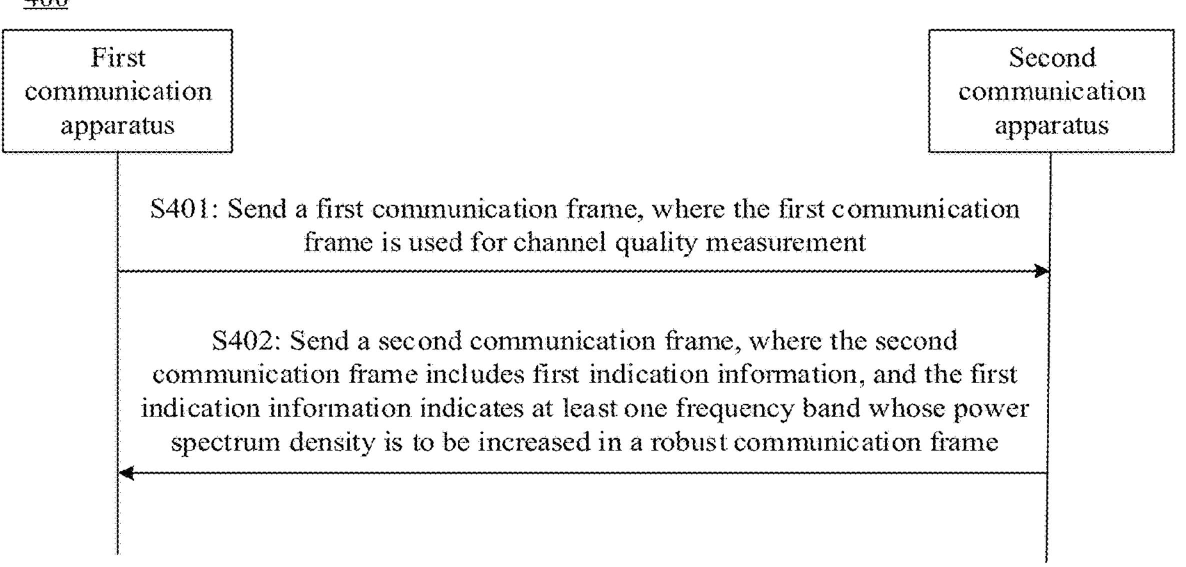
FIG. 4 is a schematic flowchart of a communication method according to an embodiment.
FIG. 5 is a diagram of PSDs of frequency bands of a third communication frame according to an embodiment.

The following describes technical solutions of this disclosure with reference to accompanying drawings.

In embodiments of this disclosure, "/" may indicate an "or" relationship between associated objects. For example, A/B may indicate A or B. "And/or" may be used to indicate that there are three relationships between associated objects. For example, A and/or B may indicate the following three cases: Only A exists, both A and B exist, and only B exists, where A and B may be singular or plural. For ease of describing technical solutions in embodiments of this disclosure, terms "first", "second", and the like may be used in embodiments of this disclosure to distinguish between technical features with a same function or similar functions. The terms "first", "second", and the like do not limit a quantity or an execution sequence, and the terms "first", "second", and the like do not indicate a definite difference.

The technical solutions in embodiments of this disclosure may be applied to a PLC system. FIG. 1 is a diagram of a PLC system to which embodiments of this disclosure are applicable. As shown in FIG. 1, the PLC system includes communication apparatuses and a power line. The communication apparatuses may be a communication apparatus 101 and a communication apparatus 102 shown in FIG. 1. The communication apparatus 101 and the communication apparatus 102 may communicate with each other through a power line 103. Various electrical loads may be added to the power line 103, and the electrical loads may include a television set 104, a printer 105, and the like shown in FIG. 1. A user may add a load to the power line 103 at any time. Consequently, load impedance and noise interference on the line change in real time. The communication apparatus can improve reliability of communication through the power line by using the solutions provided in embodiments of this disclosure.

Standards of PLC technologies mainly include HomePlug series standards (including HomePlug 1.0, HomePlug AV, HomePlug Green PHY and other standards) of the HomePlug Powerline Alliance, the Institute of Electrical and Electronics Engineers (IEEE) P1901 and P1901.1 standards, and the International Telecommunication Union (ITU) Telecommunication Standardization Sector (ITU-T) Gigabit Home Networking (G.hn) standard. An orthogonal frequency-division multiplexing (OFDM) modulation scheme is used in the foregoing protocols. The orthogonal frequency-division multiplexing modulation scheme has an advantage in ensuring stable and complete data transmission in a communication environment with severe electromagnetic interference.

Further, currently, a robust communication frame is further obtained through replication and interleaving by using a robustness solution to resist a complex channel noise condition. A robust OFDM (ROBO) mode and a robust communication mode (RCM) are defined in each of the foregoing HomePlug standards, IEEE P1901 and P1901.1 standards, and ITU-T G.hn standard. The RCM is used as an example. A forward error correction (FEC) code block is a basic unit of physical layer transmission that is defined in the G.hn standard. In the RCM, an FEC code block is processed and segmented based on a processing parameter to obtain a plurality of sections (SEC) including a same quantity of bits, the plurality of sections are replicated to obtain a plurality of copies, all sections are interleaved, and then processed sections are modulated and mapped to a plurality of OFDM symbols. Each section is modulated and mapped to a frequency domain resource of one OFDM symbol. A frequency domain resource carrying one section is a frequency band. In this way, a plurality of frequency bands on each OFDM symbol each carry one section, and sections separately carried in same frequency bands of the plurality of OFDM symbols can form the complete FEC code block. For a specific implementation of the RCM, refer to the ITU-T G.9960 standard. A frequency domain resource, to which one section is mapped, of an OFDM symbol may be a plurality of consecutive effective subcarriers. Alternatively, in an implementation, a frequency domain resource, to which each section is modulated and mapped, of an OFDM symbol may be a plurality of discrete effective subcarriers, and may also be referred to as a frequency band. In this disclosure, a frequency domain resource occupied by one section of a code block in a communication frame is referred to as a frequency band. In other words, a frequency domain resource that is in a communication frame and that carries one section is referred to as a frequency band.

For example, as shown in FIG. 2, according to the implementation of the RCM, an FEC code block is processed and segmented to obtain three sections with a same quantity of bits: a SEC 1, a SEC 2, and a SEC 3. The three sections undergo replication and interleaving, and then processed sections are modulated and mapped to three OFDM symbols. Four sections are modulated and carried in each OFDM symbol, and occupy four frequency bands of the OFDM symbol in total: a frequency band 1 to a frequency band 4. One section is modulated and carried in each frequency band, and different frequency bands include a same quantity of effective subcarriers. Sections carried in same frequency bands of the three symbols are the SEC 1, the SEC 2, and the SEC 3, namely, all sections of the FEC code block. For example, for a frequency band 1, a frequency band 1 of a symbol 1 carries the SEC 1, a frequency band 1 of a symbol 2 carries the SEC 2, and a frequency band 1 of a symbol 3 carries the SEC 3. For another example, for a frequency band 2, a frequency band 2 of the symbol 1 carries the SEC 2, a frequency band 2 of the symbol 2 carries the SEC 3, and a frequency band 2 of the symbol 3 carries the SEC 1. In addition, a frequency band 3 and a frequency band 4 each include all the sections of the FEC code block in the three symbols. A ROBO mode defined in the HomePlug standard is similar, and can achieve the same effect as that in FIG. 2. In this robust modulation scheme, each frequency band includes a complete FEC code block, to resist a complex channel condition.

However, in actual application, it is found that signal-to-noise ratios (SNR) of different frequency bands of an OFDM symbol during transmission in a channel may differ greatly, and FEC code blocks on some frequency bands may make limited contributions to final successful decoding. As shown in FIG. 3, SNRs of a frequency band 1, a frequency band 3, and a frequency band 4 are low, and correct transmission of an FEC code word is mainly implemented by a frequency band 2. The frequency band 4 has a quite low SNR, and therefore makes a quite small contribution to successful decoding. It can be learned that, in the current robustness solution, some frequency bands make limited contributions to performance of successful decoding but consume power of a transmit end. Communication efficiency needs to be improved.

This disclosure proposes a solution in which a receive end measures channel quality of different frequency bands and feeds back the channel quality to the transmit end, so that the transmit end can increase, based on the feedback of the receive end, a power spectrum density (PSD) of a frequency band with good channel quality in a robust communication frame. This can increase a signal-to-noise ratio of the frequency band during transmission in a channel, increase a probability of successful decoding, and further improve communication reliability of PLC.

FIG. 4 is a schematic flowchart of a communication method 400 according to an embodiment. The communication method 400 includes but is not limited to the following steps.

S401: A first communication apparatus sends a first communication frame to a second communication apparatus, where the first communication frame is used for channel quality measurement.

Correspondingly, the second communication apparatus receives the first communication frame from the first communication apparatus.

In an example, the first communication frame may be a data frame, and the data frame is used to carry communication data, and is further used by the second communication apparatus to measure channel quality of each frequency band. In another example, the first communication frame may be a probe frame used for channel quality measurement.

Channel quality, of the first communication frame, that is measured by the second communication apparatus may be an SNR, a signal-to-interference-plus-noise ratio (SINR), signal received power, or the like.

S402: The second communication apparatus sends a second communication frame to the first communication apparatus, where the second communication frame includes first indication information, and the first indication information indicates at least one frequency band whose power spectrum density is to be increased in a robust communication frame.

Correspondingly, the first communication apparatus receives the second communication frame from the second communication apparatus. The second communication apparatus determines, based on the first indication information in the second communication frame, the at least one frequency band whose power spectrum density is to be increased in the robust communication frame.

For example, the second communication frame may be an ACK frame for the first communication frame, or the second communication frame may be a management frame. The management frame may be a medium access control (MAC) management frame, for example, a management logical link control (LLC) frame defined in the G.hn protocol. However, this disclosure is not limited thereto.

The robust communication frame is used to transmit a code block. A plurality of sections of the code block undergo replication and interleaving, and then processed sections are modulated and mapped to different frequency bands of a plurality of symbols in the robust communication frame. In addition, for each frequency band, sections carried in different symbols can form the code block. For example, the robust communication frame may be a communication frame in an ROBO mode or in RCM in the foregoing descriptions. In this embodiment, a frequency domain resource that is in a robust communication frame and that is occupied by one section of a code block is referred to as a frequency band. In other words, a frequency domain resource that is in a robust communication frame and that carries one section is referred to as a frequency band. A robust communication frame includes a plurality of frequency bands in frequency domain, and one frequency band is used to carry one section of a code block.

In an example, the second communication apparatus measures average signal quality of subcarriers of each frequency band in the first communication frame, compares the average signal quality of the subcarriers of each frequency band with a first threshold, and determines at least one frequency band whose average signal quality is greater than the first threshold. The second communication apparatus may notify, by using the first indication information in the second communication frame, the first communication apparatus of the at least one frequency band whose power spectrum density is to be increased in the robust communication frame.

In addition, a maximum quantity M of frequency bands indicated by the first indication information may be predefined. If the first communication frame includes more than M frequency bands in which average channel quality of subcarriers is greater than the first threshold, the second communication apparatus may determine M frequency bands with highest average channel quality from the frequency bands in the first communication frame, and indicate the M frequency bands by using the first indication information.

In another example, the second communication apparatus measures channel quality of each subcarrier of each frequency band in the first communication frame, compares the channel quality of each subcarrier of each frequency band with a second threshold, and determines at least one frequency band in which channel quality of all subcarriers is greater than the second threshold. The second communication apparatus may notify, by using the first indication information in the second communication frame, the first communication apparatus of the at least one frequency band whose power spectrum density is to be increased in the robust communication frame.

In addition, if the first communication frame includes more than M frequency bands in which channel quality of all subcarriers is greater than the second threshold, the second communication apparatus may determine M frequency bands with highest average channel quality from the frequency bands in the first communication frame based on average channel quality of subcarriers of each frequency band, and indicate the M frequency bands by using the first indication information.

In the foregoing two examples, the first threshold and the second threshold may be predefined, or may be determined through information exchange between the first communication apparatus and the second communication apparatus. This is not limited in this disclosure.

In still another example, the second communication apparatus receives a plurality of communication frames from the first communication apparatus, and the plurality of communication frames include the first communication frame. The second communication apparatus measures channel quality of each frequency band in the plurality of communication frames. The channel quality may be average channel quality of subcarriers of each frequency band or channel quality of each subcarrier of each frequency band. The second communication apparatus obtains statistical channel quality of each frequency band based on the channel quality of each frequency band in the plurality of communication frames. The second communication apparatus determines, based on the statistical channel quality of each frequency band, the at least one frequency band whose power spectrum density is to be increased in the robust communication frame, and indicates the at least one frequency band by using the first indication information.

A manner of indicating, by the first indication information, the at least one frequency band whose power spectrum density is to be increased in the robust communication frame includes but is not limited to the following manners:

Manner 1: The first indication information includes a bitmap indicating the at least one frequency band, and one bit in the bitmap corresponds to one frequency band in a communication frame.

For example, the communication frame includes four frequency bands: a frequency band 0, a frequency band 1, a frequency band 2, and a frequency band 3. The bitmap in the first indication information includes four bits, and the $1^{st}$ bit to the $4^{th}$ bit of the four bits sequentially correspond to the frequency band 0 to the frequency band 3. For example, a bit in the bitmap being set to "1" indicates that a frequency band corresponding to the bit is indicated, to be specific, the frequency band is a frequency band whose power spectrum density is to be increased; and a bit being set to "0" indicates that a frequency band corresponding to the bit is not indicated, to be specific, the frequency band is not a frequency band whose power spectrum density is to be increased. For example, the at least one frequency band that is indicated by the first indication information and whose power spectrum density is to be increased is the frequency band 1 and the frequency band 2. In this case, the bitmap in the first indication information is "0110". After receiving the second communication frame, the first communication apparatus may determine, based on the $2^{nd}$ bit in the bitmap being set to "1" and the $3^{rd}$ bit in the bitmap being set to "1", that the frequency band 1 and the frequency band 2 are frequency bands whose power spectrum densities need to be increased. Alternatively, in the bitmap, a bit being set to "0" may indicate that a frequency band corresponding to the bit is indicated, and a bit being set to "1" may indicate that a frequency band corresponding to the bit is not indicated. This is not limited in this disclosure.

Manner 2: The first indication information includes an identifier of the at least one frequency band whose power spectrum density needs to be increased.

For example, the communication frame includes four frequency bands: a frequency band 0, a frequency band 1, a frequency band 2, and a frequency band 3. The first communication apparatus and the second communication apparatus reach a consensus on an identifier of each frequency band. For example, the first indication information indicates the frequency band 1 and the frequency band 2. In this case, the first indication information includes an identifier of the frequency band 1 and an identifier of the frequency band 2. After receiving the second communication frame, the first communication apparatus may determine, based on the identifiers of the frequency bands in the first indication information, that the frequency band 1 and the frequency band 2 are frequency bands whose power spectrum densities need to be improved.

In an implementation, the first communication apparatus determines a power spectrum density of at least one frequency band in a third communication frame based on a quantity of frequency bands indicated by the first indication information and a first correspondence, where the first correspondence is a correspondence between a plurality of quantities of frequency bands and a plurality of power spectrum densities.

The first correspondence may be a direct correspondence between a plurality of quantities of frequency bands and a plurality of power spectrum densities. To be specific, one quantity of frequency bands corresponds to one power spectrum density. Alternatively, the first correspondence may be an indirect correspondence between a plurality of quantities of frequency bands and a plurality of power spectrum densities. For example, one quantity of frequency bands corresponds to one increase in a power spectrum density, and a power spectrum density may be determined based on the increase in a power spectrum; or one frequency band focusing ratio may be determined based on one quantity of frequency bands, and one frequency band focusing ratio may directly or indirectly correspond to one power spectrum density. Examples are used below for description.

For example, the first correspondence may be a correspondence between a quantity of frequency bands and an increased in a power spectrum density (PSD). A communication frame includes four frequency bands. For example, the first correspondence is shown in Table 1. If a quantity of frequency bands indicated by the first indication information is 2, power spectrum densities of the two frequency bands are increased by 3 decibels (dB). If a quantity of frequency bands indicated by the first indication information is 1, a power spectrum density of the frequency band is increased by 6 dB relative to a power spectrum density of the frequency band in the first communication frame. An increase shown in Table 1 may be an increase in a power spectrum density of a frequency band indicated by the first indication information relative to a power spectrum density of a corresponding frequency band in the first communication frame. For example, the first indication information indicates a frequency band 1. In this case, the first communication apparatus may determine to increase a power spectrum density of the frequency band 1 among the four frequency bands. Based on the correspondence shown in Table 1, the first communication apparatus may determine that an increase in the power spectrum density of the frequency band 1 is 6 dB. Therefore, when sending a robust communication frame, the first communication apparatus increases the power density of the frequency band 1 by 6 dB relative to a power spectrum density of the frequency band 1 in the first communication frame.

TABLE 1

| Quantity of frequency bands indicated by the first indication information | Increase in a PSD |
|---|---|
| 2 | 3 dB |
| 1 | 6 dB |

To keep total transmit power of a communication frame stable, if the frequency band 1 is increased by 6 dB in the robust communication frame, power spectrum densities of the other three frequency bands, namely, a frequency band 0, a frequency band 2, and a frequency band 3, are decreased by 20 dB or more relative to power spectrum densities of the three frequency bands in the first communication frame, as shown in FIG. 5. In this way, total transmit power used by the first communication apparatus to send the robust communication frame remains unchanged. This can reduce unnecessary power consumption of the first communication apparatus.

Alternatively, an increase in a power spectrum density in Table 1 may be an increase relative to a default power spectrum density of a frequency band whose power spectrum density needs to be increased. For example, a power spectrum density of each frequency band in the first communication frame is a default power spectrum density. This is not limited in this disclosure.

For another example, as shown in Table 2, the first correspondence may be a correspondence between a power focusing ratio and an increase in a power spectrum density (PSD). The power focusing ratio is a ratio of a quantity of frequency bands whose power needs to be increased to a total quantity of frequency bands. For example, the first indication information indicates one frequency band, for example, a frequency band 1, and a total quantity of frequency bands is 4. In this case, a power focusing ratio is ¼, and the first communication apparatus may determine to increase the frequency band 1 by 6 dB.

TABLE 2

| Power focusing ratio | Increase in a PSD |
|---|---|
| ½ | 3 dB |
| ¼ | 6 dB |

Whether a reference amount for an increase in a power spectrum density is a power spectrum density of a corresponding frequency band in the first communication frame, a default power spectrum density, or another power spectrum density may be predefined, or determined through information exchange between the first communication apparatus and the second communication apparatus. In this embodiment of this disclosure, an example in which a reference amount is a power spectrum density of a corresponding frequency band in the first communication frame is used for description. It should be understood that this disclosure is not limited thereto.

In another implementation, the second communication frame further includes second indication information, and the second indication information indicates a power spectrum density of the at least one frequency band, or the second indication information indicates an increase in a power spectrum density of the at least one frequency band.

As described in the foregoing implementation, the first communication apparatus may determine the power spectrum density of the at least one frequency band based on the quantity of frequency bands indicated by the first indication information and the first correspondence. In this implementation, the second communication apparatus may notify, by using the second indication information in the second communication frame, the first communication apparatus of the power spectrum density of the at least one frequency band whose power spectrum density needs to be increased or the increase in the power spectrum density, so that the first communication apparatus can obtain a power spectrum density of the at least one frequency band in a robust communication frame based on the second indication information.

After the first communication apparatus determines, based on the second communication frame, a frequency band whose power spectrum density needs to be increased and a corresponding power spectrum density, the first communication apparatus sends a third communication frame to the second communication apparatus. The third communication frame is a robust communication frame. A power spectrum density of the at least one frequency band (to be specific, the at least one frequency band indicated by the first indication information) in the third communication frame is greater than a power spectrum density of at least one frequency band in the first communication frame.

In an implementation, the first communication frame is a data frame, and data in the third communication frame is retransmitted data of data in the first communication frame.

For example, if the first communication apparatus sends the first communication frame to the second communication apparatus but the second communication apparatus fails to receive the data carried in the first communication frame, the second communication apparatus notifies, by using the second communication frame, the first communication apparatus that the data in the first communication frame is not successfully received. In this case, the second communication frame is an ACK frame for the first communication frame. In addition, the second communication frame includes the first indication information, and the first communication apparatus is notified of at least one frequency band with good channel quality, so that the first communication apparatus increases a power spectrum density of the at least one frequency band in the third communication frame that includes the retransmitted data. A power spectrum density of a frequency band with good channel quality is increased, so that transmission reliability of a communication frame can be improved, and a probability that a communication frame is correctly received is increased. Optionally, the first communication apparatus decreases a power spectrum density of a frequency band other than the at least one frequency band in the third communication frame, so that unnecessary power consumption can be reduced.

In another implementation, the first communication frame may be a data frame, and the third communication frame is a data frame including initially transmitted data.

For example, the second communication apparatus sends the second communication frame to the first communication apparatus after successfully receiving data in the first communication frame and obtaining, through measurement, at least one frequency band with good channel quality in the first communication frame. For example, the second communication frame may be an ACK frame indicating that the first communication frame is successfully received. After receiving the second communication frame, the first communication apparatus may increase, based on the first indication information in the second communication frame, a power spectrum density of the at least one frequency band in the third communication frame including the initially transmitted data, to improve transmission reliability of the third communication frame.

In the foregoing two implementations, an example in which the second communication frame is an ACK frame is used for description. However, this disclosure is not limited thereto. The second communication frame may alternatively be the management frame (for example, the management LLC frame) in the foregoing descriptions.

In still another implementation, the first communication frame may be a probe frame, and the second communication frame is a management frame (for example, a management LLC frame). The first communication apparatus increases, based on the first indication information, a power spectrum density of at least one frequency band in a subsequently sent robust communication frame (namely, the third communication frame).

In an implementation, the embodiment shown in FIG. 4 may be further applied to multicast communication. If there are a plurality of receive ends, namely, a plurality of second communication apparatuses, the first communication frame sent by the first communication apparatus is received by the plurality of second communication apparatuses. Each communication apparatus measures the first communication frame to obtain channel quality of each frequency band, and determines at least one frequency band with good channel quality. The plurality of second communication apparatuses each send a second communication frame to the first communication apparatus, and notify, by using first indication information in the second communication frame, the first communication apparatus of at least one frequency band that has good channel quality and that is determined by each of the plurality of second communication apparatuses. The first communication apparatus summarizes frequency bands with good channel quality that are fed back by the plurality of second communication apparatuses, and determines a frequency band whose communication quality needs to be improved in a multicast communication frame and a corresponding power spectrum density. The first communication apparatus sends a third communication frame, where the third communication frame is a robust multicast communication frame that the plurality of second communication apparatuses need to receive, and the first communication apparatus has increased power spectrum densities of some frequency bands in the third communication frame. This can improve transmission reliability of a communication frame.

For example, there are three second communication apparatuses denoted as a second communication apparatus A, a second communication apparatus B, and a second communication apparatus C. The first communication apparatus sends the first communication frame, and the three second communication apparatuses receive the first communication apparatus and determine frequency bands with good channel quality through measurement. For example, the second communication apparatus A determines a frequency band 1, a frequency band 2, and a frequency band 3, the second communication apparatus B determines a frequency band 0 and the frequency band 1, and the second communication apparatus C determines the frequency band 1 and the frequency band 2. The three second communication apparatuses each send a second communication frame to the first communication apparatus. The first communication apparatus determines, based on frequency bands fed back by the three second communication apparatuses, a frequency band whose power spectrum density is to be increased. For example, the frequency band whose power spectrum density is to be increased may be the frequency band 1 with good channel quality that is fed back by all the three second communication apparatuses. In this case, the first communication apparatus increases a power spectrum density of the frequency band 1 in the robust multicast communication frame. Alternatively, the first communication apparatus determines the frequency band 1 and the frequency band 2 with good channel quality that are fed back by at least two second communication apparatuses, and increases a power spectrum density of the frequency band 1 in the robust multicast communication frame. This is not limited in this disclosure.

According to the foregoing solution, after measuring channel quality of each frequency band based on a communication frame, a receive end (namely, the second communication apparatus) feeds back a frequency band with good channel quality to a transmit end (namely, the first communication apparatus), and the transmit end increases a power spectrum density of at least one frequency band in a robust communication frame based on the frequency band with good channel quality that is fed back by the receive end. A power spectrum density of a frequency band with good channel quality is increased, so that reliability of multicast communication can be improved.

This disclosure further provides a solution in which a transmit end determines, based on channel quality of each frequency band that is fed back by a receive end, a frequency band whose power spectrum density is to be increased, to improve reliability of a communication frame.

Figure 6:
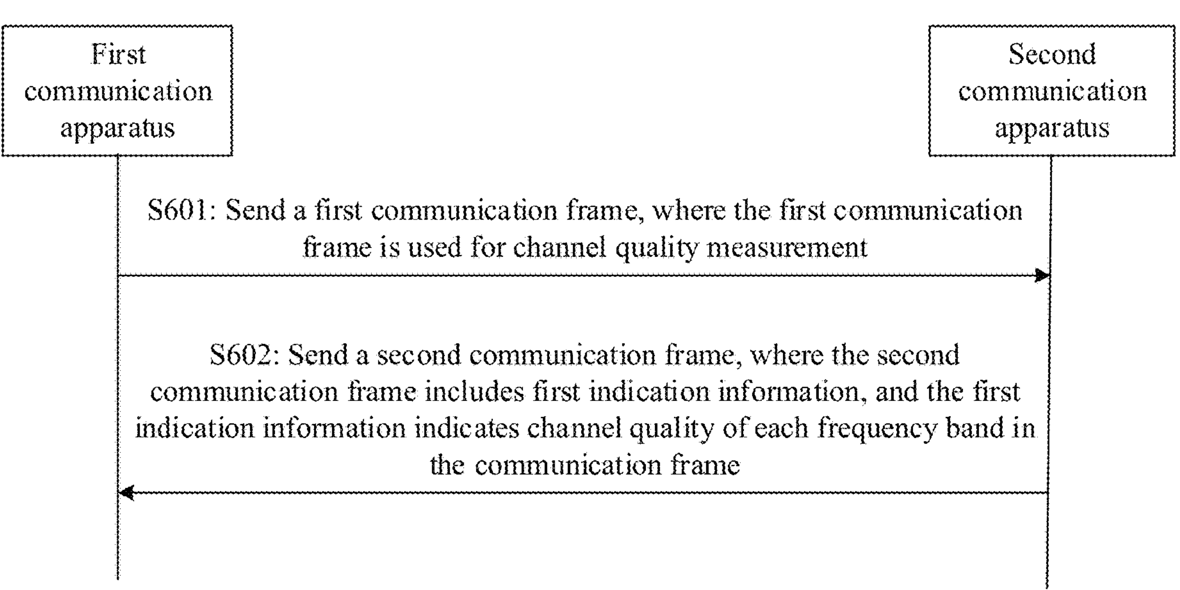
FIG. 6 is another schematic flowchart of a communication method according to an embodiment.

FIG. 6 is a schematic flowchart of a communication method 600 according to an embodiment. For a part of the embodiment shown in FIG. 6 that is the same as a part of the embodiment shown in FIG. 4, refer to the descriptions in the embodiment shown in FIG. 4. Details are not described herein again. The following mainly describes a difference between the embodiment shown in FIG. 6 and the embodiment shown in FIG. 4. The communication method 600 includes but is not limited to the following steps.

S601: A first communication apparatus sends a first communication frame to a second communication apparatus, where the first communication frame is used for channel quality measurement.

Correspondingly, the second communication apparatus receives the first communication frame from the first communication apparatus. The second communication apparatus measures channel quality of each frequency band in the first communication frame.

S602: The second communication apparatus sends a second communication frame to the first communication apparatus, where the second communication frame includes first indication information, and the first indication information indicates channel quality of each frequency band in the communication frame.

Correspondingly, the first communication apparatus receives the second communication frame from the second communication apparatus. The first communication apparatus determines, based on the first indication information, at least one frequency band whose power spectrum density needs to be increased. For a manner of determining, by the first communication apparatus, the at least one frequency band based on the channel quality, refer to the manner of determining, by the second communication apparatus, at least one frequency band based on channel quality in the embodiment shown in FIG. 4. Details are not described herein again.

After determining the at least one frequency band whose power spectrum density is to be increased, the first communication apparatus may determine a power spectrum density of the at least one frequency band in a robust communication frame based on a quantity of frequency bands included in the at least one frequency band and a first correspondence. Alternatively, the first communication apparatus may determine a power spectrum density of the at least one frequency band based on an implementation of the first communication apparatus.

The first communication apparatus sends a third communication frame to the second communication apparatus, where the third communication frame is the robust communication frame. A power spectrum density of the at least one frequency band (to be specific, the at least one frequency band determined by the first communication apparatus based on the channel quality) in the third communication frame is greater than a power spectrum density of at least one frequency band in the first communication frame.

The third communication frame includes retransmitted data of data in the first communication frame. Alternatively, the third communication frame may be an initially transmitted data frame or another robust communication frame that is sent by the first communication apparatus after the first communication apparatus receives the second communication frame. This is not limited in this disclosure.

According to the foregoing solution, after obtaining channel quality of each frequency band by measuring the first communication frame, a receive end (namely, the second communication apparatus) feeds back the channel quality of each frequency band in the communication frame to a transmit end (namely, the second communication apparatus), so that the transmit end can determine a frequency band with good channel quality based on the channel quality fed back by the receive end, and increase a power spectrum density of the frequency band with good channel quality in a robust communication frame. This can improve transmission reliability of a communication frame, and increase a probability that a communication frame is correctly received.

In an implementation, the embodiment shown in FIG. 6 may be further applied to multicast communication. The first communication frame sent by the first communication apparatus is received by a plurality of second communication apparatuses. After measuring the first communication frame to obtain channel quality of each frequency band, each communication apparatus sends a second communication frame to the first communication apparatus, to notify the first communication apparatus of the channel quality of each frequency band that is measured by each of the plurality of second communication apparatuses. The first communication apparatus summarizes channel quality fed back by the plurality of second communication apparatuses, and determines a frequency band whose communication quality needs to be improved in a multicast communication frame and a corresponding power spectrum density. The first communication apparatus increases a power spectrum density of a frequency band with good channel quality in a multicast communication frame to be sent. This can improve transmission reliability of a communication frame.

It can be understood that, to implement the functions in the foregoing embodiments, a base station and a terminal include corresponding hardware structures and/or software modules for performing the functions. Persons skilled in the art should be easily aware that, in this disclosure, the units and the method steps in the examples described with reference to embodiments disclosed in this disclosure can be implemented through hardware or a combination of hardware and computer software. Whether a function is performed through hardware or hardware driven by computer software depends on particular application scenarios and design constraints of technical solutions.

Figure 7:
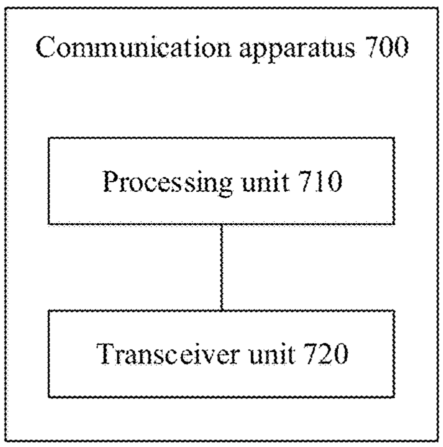
FIG. 7 is a diagram of a structure of a communication apparatus according to an embodiment.
Figure 8:
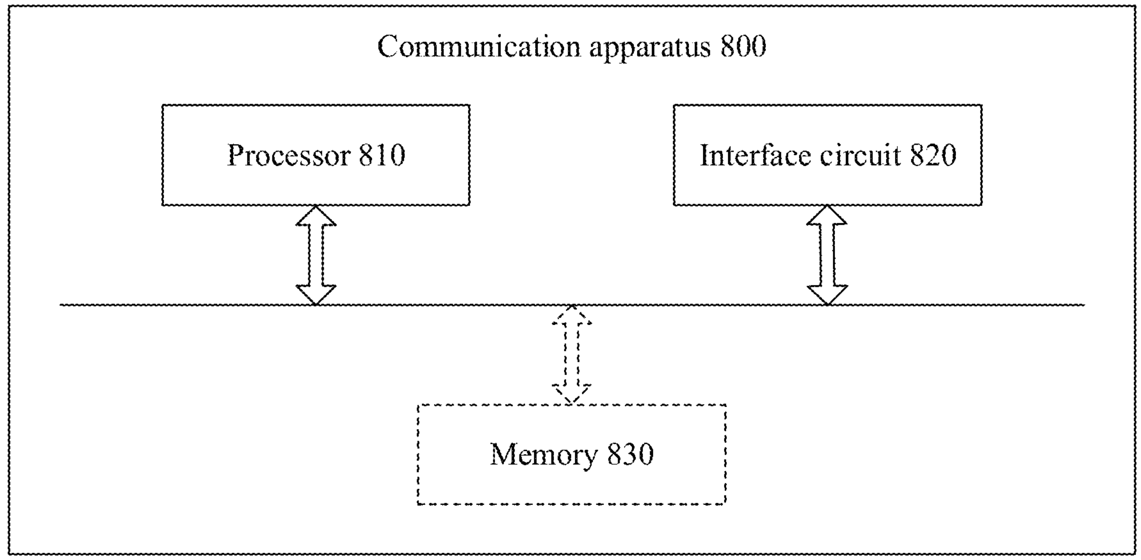
FIG. 8 is another diagram of a structure of a communication apparatus according to an embodiment.

FIG. 7 and FIG. 8 are diagrams of possible structures of communication apparatuses according to embodiments of this disclosure. The communication apparatuses may be configured to implement the functions of the first communication apparatus and the second communication apparatus in the method embodiments, and therefore can also achieve the beneficial effect of the method embodiments. In this embodiment, the communication apparatus may be one of the communication apparatus 101 and the communication apparatus 102 shown in FIG. 1, or may be a module (for example, a chip) used in a communication device.

As shown in FIG. 7, a communication apparatus 700 includes a processing unit 710 and a transceiver unit 720. The communication apparatus 700 may be configured to implement functions of a terminal or a network device in the method embodiments shown in FIG. 4 and FIG. 6.

When the communication apparatus 700 is configured to implement the functions of the first communication apparatus in the method embodiments shown in FIG. 4 and FIG. 6, the transceiver unit 720 is configured to send a first communication frame to a second communication apparatus, where the first communication frame is used for channel quality measurement; and the transceiver unit 720 is further configured to receive a second communication frame from the second communication apparatus, where the second communication frame includes first indication information, and the first indication information indicates at least one frequency band whose power spectrum density is to be increased in a robust communication frame, or the first indication information indicates channel quality of at least one frequency band in a robust communication frame. The processing unit 710 may be configured to control the transceiver unit 720 to receive or send a communication frame.

When the communication apparatus 700 is configured to implement the functions of the second communication apparatus in the method embodiments shown in FIG. 4 and FIG. 6, the transceiver unit 720 is configured to receive a first communication frame from a second communication apparatus, where the first communication frame is used for channel quality measurement. The transceiver unit 720 is further configured to send a second communication frame to the first communication apparatus, where the second communication frame includes first indication information, and the first indication information indicates at least one frequency band whose power spectrum density is to be increased in a robust communication frame, or the first indication information indicates channel quality of at least one frequency band in a robust communication frame. The processing unit 710 may be configured to control the transceiver unit 720 to receive or send a communication frame.

For more detailed descriptions of the processing unit 710 and the transceiver unit 720, refer to related descriptions in the method embodiment shown in FIG. 4.

As shown in FIG. 8, a communication apparatus 800 includes a processor 810 and an interface circuit 820. The processor 810 and the interface circuit 820 are coupled to each other. It can be understood that the interface circuit 820 may be a transceiver or an input/output interface. Optionally, the communication apparatus 800 may further include a memory 830, configured to store instructions to be executed by the processor 810, or store input data required by the processor 810 to run instructions, or store data generated after the processor 810 runs instructions.

When the communication apparatus 800 is configured to implement the method shown in FIG. 4, the processor 810 is configured to implement the functions of the processing unit 710, and the interface circuit 820 is configured to implement the functions of the transceiver unit 720.

When the communication apparatus is a chip used in a communication device, the chip implements the functions of the first communication apparatus in the method embodiments. The chip receives information from another module (for example, a radio frequency module or an antenna) in the communication device, where the information is sent by the second communication apparatus to the first communication apparatus. Alternatively, the chip sends information to another module (for example, the radio frequency module or the antenna) in the communication device, where the information is sent by the first communication apparatus to the second communication apparatus.

When the communication apparatus is a chip used in a communication device, the chip implements the functions of the second communication apparatus in the method embodiments. The chip receives information from another module (for example, a radio frequency module or an antenna) in the communication device, where the information is sent by the first communication apparatus to the second communication apparatus. Alternatively, the chip sends information to another module (for example, the radio frequency module or the antenna) in the communication device, where the information is sent by the second communication apparatus to the first communication apparatus.

It can be understood that the processor in embodiments of this disclosure may be a central processing unit (CPU), or may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor or any other processor.

The method steps in embodiments of this disclosure may be implemented in hardware, or may be implemented in software instructions that can be executed by the processor. The software instructions may include corresponding software modules. The software modules may be stored in a random access memory, a flash memory, a read-only memory, a programmable read-only memory, an erasable programmable read-only memory, an electrically erasable programmable read-only memory, a register, a hard disk, a removable hard disk, a CD-ROM, or any other form of storage medium well-known in the art. For example, a storage medium is coupled to the processor, so that the processor can read information from the storage medium and write information into the storage medium. The storage medium may alternatively be a component of the processor. The processor and the storage medium may be located in an ASIC. In addition, the ASIC may be located in a network device or a terminal. Alternatively, the processor and the storage medium may exist in a network device or a terminal as discrete components.

All or some of the foregoing embodiments may be implemented by software, hardware, firmware, or any combination thereof. When the embodiments are implemented by software, all or some of the embodiments may be implemented in a form of a computer program product. The computer program product includes one or more computer programs or instructions. When the computer programs or instructions are loaded and executed on a computer, all or some of the processes or the functions in embodiments of this disclosure are performed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium accessible to a computer, or a data storage device, such as a server or a data center, integrating one or more usable media. The usable medium may be a magnetic medium, for example, a floppy disk, a hard disk, or a magnetic tape; or may be an optical medium, for example, a digital video disc; or may be a semiconductor medium, for example, a solid-state drive. The computer-readable storage medium may be a volatile or non-volatile storage medium, or may include two types of storage media: a volatile storage medium and a non-volatile storage medium.

The foregoing descriptions are merely specific implementations of this disclosure, but are not intended to limit the protection scope of this disclosure. In embodiments of this disclosure, unless otherwise specified or a logical conflict occurs, terms and/or descriptions in different embodiments are consistent and may be mutually referenced, and technical features in different embodiments may be combined based on an internal logical relationship thereof, to form a new embodiment.

The invention claimed is:

1. A method comprising:

sending, through a power line, a first communication frame to a communication apparatus; and receiving, through the power line and in response to the first communication frame, a second communication frame from the communication apparatus, wherein the second communication frame comprises first indication information, and wherein the first indication information indicates at least one frequency band having a power spectrum density that is to be increased in a robust communication frame.

2. The method of claim 1, further comprising sending, through the power line, a third communication frame to the communication apparatus, wherein a power spectrum density of the at least one frequency band in the third communication frame is greater than a power spectrum density of at least one frequency band in the first communication frame, wherein the third communication frame is the robust communication frame.

3. The method of claim 2, wherein the third communication frame is a data frame, and data in the third communication frame is initially transmitted data, or wherein both the first communication frame and the third communication frame are data frames, and data in the third communication frame is retransmitted data of data in the first communication frame.

4. The method of claim 2, further comprising identifying the power spectrum density of the at least one frequency band in the third communication frame based on a quantity of frequency bands comprised in the at least one frequency band and a first correspondence, wherein the first correspondence is between quantities of frequency bands and power spectrum densities.

5. The method of claim 2, wherein the third communication frame is a broadcast frame or a multicast frame.

6. The method of claim 1, wherein the robust communication frame is in a robust orthogonal frequency-division multiplexing (ROBO) mode or a robust communication mode (RCM).

7. The method of claim 1, wherein the second communication frame is an acknowledgement frame for the first communication frame, or the second communication frame is a management frame.

8. The method of claim 1, wherein the first communication frame is a probe frame.

9. The method of claim 1, wherein the first indication information comprises a bitmap indicating the at least one frequency band, and one bit in the bitmap corresponds to one frequency band in a communication frame, or wherein the first indication information comprises an identifier of the at least one frequency band.

10. The method of claim 1, wherein the second communication frame further comprises second indication information, and the second indication information indicates the power spectrum density of the at least one frequency band, or wherein the second indication information indicates an increase in the power spectrum density of the at least one frequency band.

11. A method comprising:

receiving, through a power line, a first communication frame from a communication apparatus; and sending, through the power line and in response to the first communication frame, a second communication frame to the communication apparatus, wherein the second communication frame comprises first indication information, and wherein the first indication information indicates at least one frequency band having a power spectrum density that is to be increased in a robust communication frame.

12. The method of claim 11, further comprising receiving, through the power line, a third communication frame from the communication apparatus, wherein a power spectrum density of the at least one frequency band in the third communication frame is greater than a power spectrum density of at least one frequency band in the first communication frame, and wherein the third communication frame is the robust communication frame.

13. The method of claim 12, wherein the third communication frame is a data frame, and data in the third communication frame is initially transmitted data, or wherein both the first communication frame and the third communication frame are data frames, and data in the third communication frame is retransmitted data of data in the first communication frame.

14. The method of claim 12, wherein the third communication frame is a broadcast frame or a multicast frame.

15. The method of claim 11, wherein the robust communication frame is a communication frame in a robust orthogonal frequency-division multiplexing (ROBO) mode or a robust communication mode (RCM).

16. The method of claim 11, wherein the second communication frame is an acknowledgement (ACK) frame for the first communication frame, or the second communication frame is a management frame.

17. The method of claim 11, wherein the first communication frame is a probe frame.

18. The method of claim 11, wherein the first indication information comprises a bitmap indicating the at least one frequency band, and one bit in the bitmap corresponds to one frequency band in a communication frame, or wherein the first indication information comprises an identifier of the at least one frequency band.

19. The method of claim 11, wherein the second communication frame further comprises second indication information, and the second indication information indicates the power spectrum density of the at least one frequency band, or wherein the second indication information indicates an increase in the power spectrum density of the at least one frequency band.

20. A first communication apparatus, comprising:

a memory configured to store instructions; and a processor coupled to the memory, and configured to execute the instructions to cause the first communication apparatus to:

send a first communication frame to a second communication apparatus; and receive a second communication frame from the second communication apparatus and in response to the first communication frame, wherein the second communication frame comprises first indication information, and wherein the first indication information indicates at least one frequency band having a power spectrum density that is to be increased in a robust communication frame.

* * * * *